Oct. 24, 1967  J. A. FLINT ET AL  3,348,618
HELICOPTER ROTOR

Filed Oct. 15, 1965  6 Sheets-Sheet 1

John A. Flint
James E. George
Inventors

By
Stevens, Davis, Miller & Mosher
Attorneys

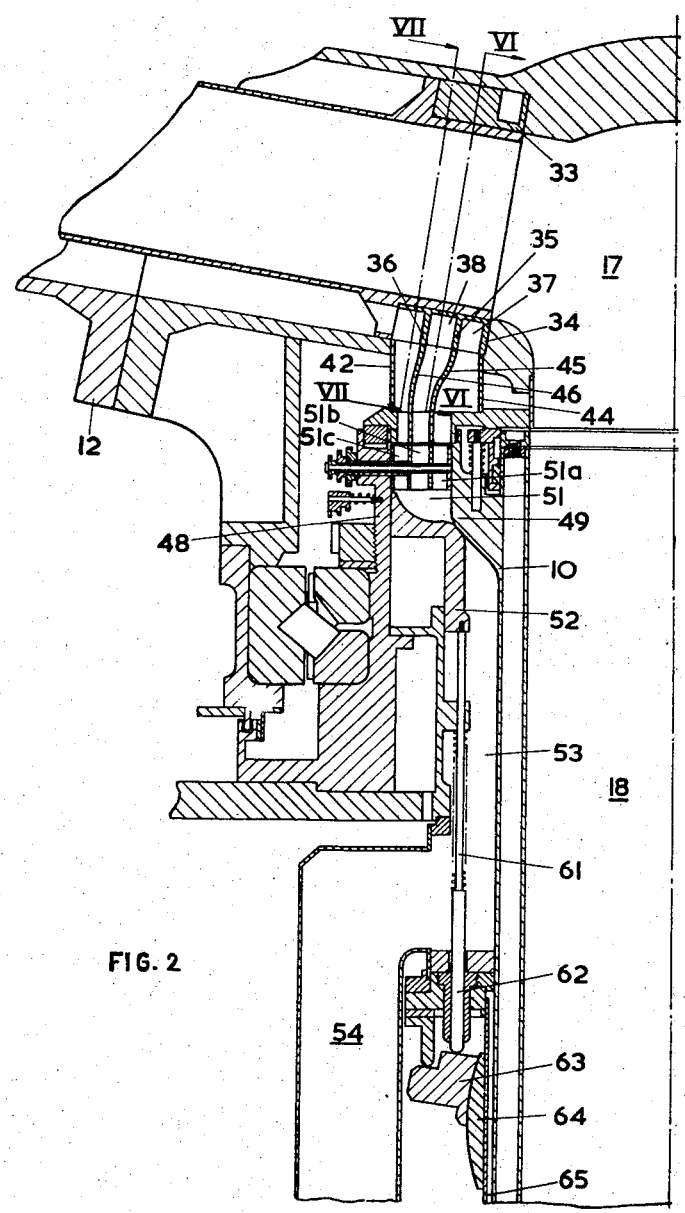

Oct. 24, 1967  J. A. FLINT ET AL  3,348,618
HELICOPTER ROTOR

Filed Oct. 15, 1965  6 Sheets-Sheet 4

John A Flint
James E. George
Inventors
By
Stevens, Davis, Miller & Mosher
Attorneys United States Patent Office
3,348,618
Patented Oct. 24, 1967

3,348,618
HELICOPTER ROTOR
John Avery Flint and James Eric George, Farnborough, England, assignors to Power Jets (Research and Development) Limited, London, England
Filed Oct. 15, 1965, Ser. No. 496,475
Claims priority, application Great Britain, Oct. 20, 1964, 42,707/64
12 Claims. (Cl. 170—135.4)

ABSTRACT OF THE DISCLOSURE

In a helicoper rotor having blades of substantially circular cross-section on which lift is induced by blowing streams of air over the surface of the blades from slots formed therein, the hub comprises a fixed pillar with a rotatable head mounted thereon. The air supply to the slots passes by way of a ring of segmental passages disposed around the pillar to transfer ports in the head and then to the appropriate blade. Slide valves, one in each of the segmental channels, are operated through push rods from a swash plate mounted around the pillar and serve to throttle the air according to the angle of the swash plate. The air supply to the blades may be further varied by subdividing the segmental passages circumferentially, providing independently operable throttle valves in each sub-division and conveying the air to separate spanwise sections of the slots in the blades.

---

This invention relates to helicopter rotors and more specifically to means for varying the aerodynamic lift on helicopter rotor blades.

British patent specifications Nos. 944,010, 948,947 and 956,013 relate to aircraft including helicopter rotors having blades of substantially circular cross-section. Lift on these blades is induced by discharging streams of compressed air rearwardly from one or more shallow spanwise extending apertures formed in the surface of each blade. The arrangements described in the aforesaid specifications effectively dispense with the blade hinges associated with rotors having blades of more conventional aerofoil section. Additionally the air discharge from the blade apertures is controlled to effect cyclic and collective alterations in blade lift similar to those obtained by blade incidence variation in the conventional type rotor. According to the above specifications this is done in various ways all involving somewhat cumbersome mechanisms in the rotating head of the rotor hub assembly.

Co-pending prior patent application Ser. No. 408,106 (now Patent No. 3,288,225) is directed to a simplified rotor hub construction for use with blades preferably of substantially circular cross-section wherein means for varying the aerodynamic lift on the blades is associated with non-rotating structure.

For efficient vertical flight it is necessary to have a large diameter rotor which becomes an embarrassment in forward flight, for three reasons, namely, compressibility effects on the advancing blade, reversed flow, and blade stalling on the retreating blade. The onset of compressibility effects on the advancing blade causes a marked loss of lift together with an appreciable increase of the drag coefficient. On the retreating blade, the relative air flow over the inboard end of the blade becomes negative as soon as the helicopter goes into forward flight and the air velocity is reduced over the whole of the blade requiring the average angle of attack of that blade to be increased to counteract the lift force produced on the advancing blade and thus balance the moments across the rotor disc. This increase in incidence will accentuate the stalling of the outside end of the retreating blade with consequent loss of lift and out of balance moment on the helicopter and the onset of severe vibration. A small amount of retreating blade stall can be tolerated but increasing forward speed at constant rotor speed causes an increase in the area affected and thus very rapidly results in an intolerable vibration level being reached. This situation could be averted by increasing the rotor speed but this causes a larger span of the advancing blade to become supercritical with corresponding loss of lift.

Another factor arises from the fact that when a helicopter blade moves in azimuth while the machine is in forward flight the drag on the blade varies from a maximum value when the blade is advancing at 90° to the fuselage to a minimum value 180° later. For a two-bladed rotor this can result in a large oscillatory force which will add to the vibration.

A conventional helicopter rotor blade is provided with a drag hinge which allows the blade to move in the rotor rotational plane and thus absorb the differences in torque due to the fluctuating drag forces associated with the varying air speed during each complete revolution of the rotor. A secondary purpose of the drag hinge is to counteract the Coriolus force produced by the vertical flapping motion of the blade. It is however a feature of the rotors of the aforementioned prior specifications that all hinges are eliminated in the interests of simplified construction.

Some allowance for compressibility effects towards the blade tip and the reverse flow region on the inner section of the retreating blade, can be made by modifying the circulation over the blade during roation of the rotor and this can be effected to a certain extent by applying a cyclic control.

A more effective method of reducing vibration however is to vary the spanwise lift distribution along the blade in such a manner that the induced drag and the profile drag variations tend to cancel one another while maintaining the lift and moment equilibrium on the rotor. The invention is directed to this end.

A helicopter rotor according to the invention comprises one or more blades on which lift can be induced by the discharge of fluid streams rearwardly from one or more spanwise-extending apertures formed in the surface of each blade, and means for varying the discharge of fluid spanwise along the blade.

The invention also provides a helicopter rotor as above wherein fluid flowing to the blade apertures is first divided between two or more groups of channels, each channel being provided with means for modulating the fluid flow through it, and means for connecting each groups of channels with a separate spanwise section of the blade.

According to a feature of the invention, the channels are associated with a non-rotating part of the rotor assembly.

The invention is not limited in its application to aircraft of the type described in the prior patent specifications but can be utilised in other forms of helicopter in which lift on the blade is to be varied by the control of spanwise extending fluid streams discharged therefrom.

An embodiment of the invention will now be described by way of example with reference to the accompanying drawings of which:

FIGURE 1 represents the area swept by a helicopter rotor rotating about a center at C. The direction of rotation is indicated by arrow B and the airflow over the rotor disc by arrow A.

Compressibility effects on the tip of the advancing blade will be experienced in the shaded region 1, reversed flow takes place over the inboard section of the retreating blade in the area 2 while stalling of the outside end of the retreating blade will occur in the area denoted by 3.

Figure 2:
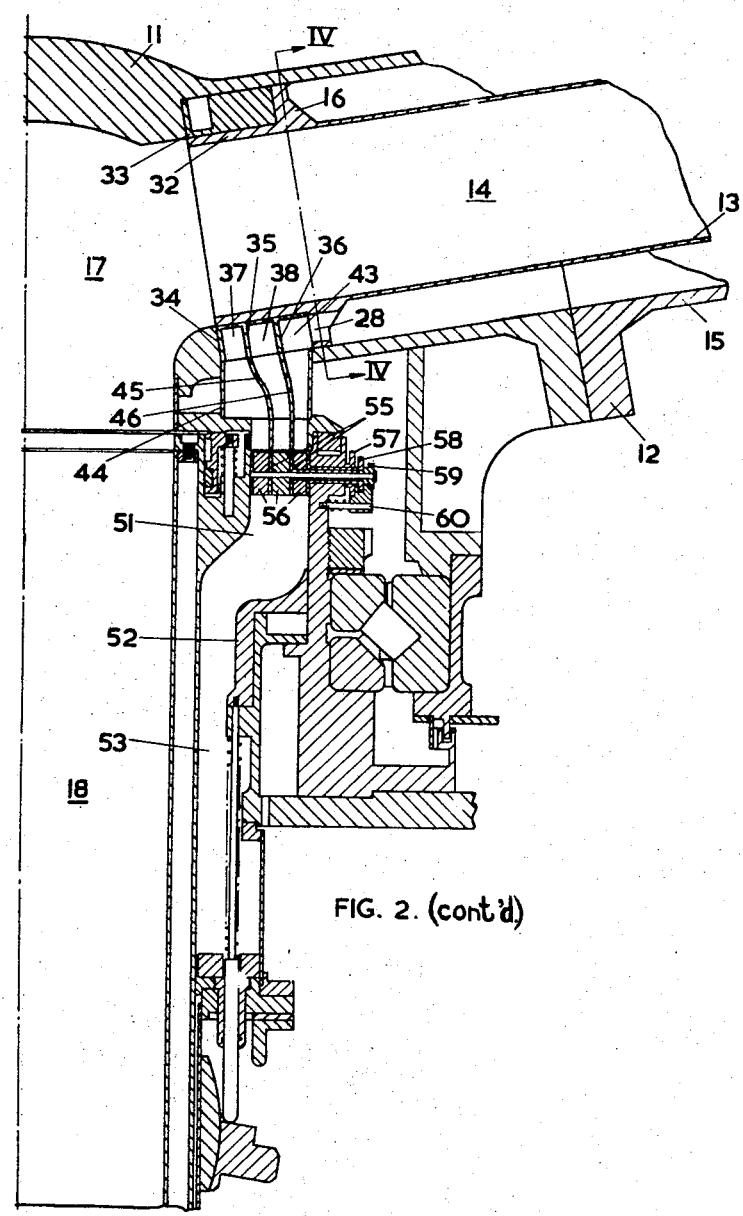
FIGURE 2 is an axial sectional view of a helicopter rotor hub assembly.

As shown in FIGURE 2 the hub assembly is generally similar to that described in Patent No. 3,288,225 and is constituted by a hollow pillar 10 and a rotating head 11 mounted on the pillar. The pillar has double walls for insulation purposes and is suitably supported in the aircraft structure, while the rotating head forms a root attachment for the rotor blades 12. The rotor blades are of substantially circular cross-section and are driven by jet propulsion nozzles (not shown) mounted at their tips. With blades of such section, aerodynamic lift must be induced by boundary layer control and preferably this is done by forming the blades with long shallow apertures extending along the blade span and arranged to discharge fluid streams as thin layers over the blade surfaces. The aforementioned prior patent specifications disclose examples of blades with such apertures. The blades each comprise a liner 13 forming a duct 14 extending along the length of the blade internally thereof through which gases for propulsion are led to the jet propulsion nozzles, and an outer shell 15. Near its inner end the liner is formed with a flange 16 which serves as a support and also locates the duct relative to the outer shell. The annular space between the liner and the shell serves to conduct air to discharge apertures formed in the surface of the blade proper.

The duct 14 opens out of a chamber 17 in the rotating head which chamber in turn is in communication with a space 18 within the hollow pillar 10 whence are led jet streams discharged from the aircraft power plant.

Figure 4:
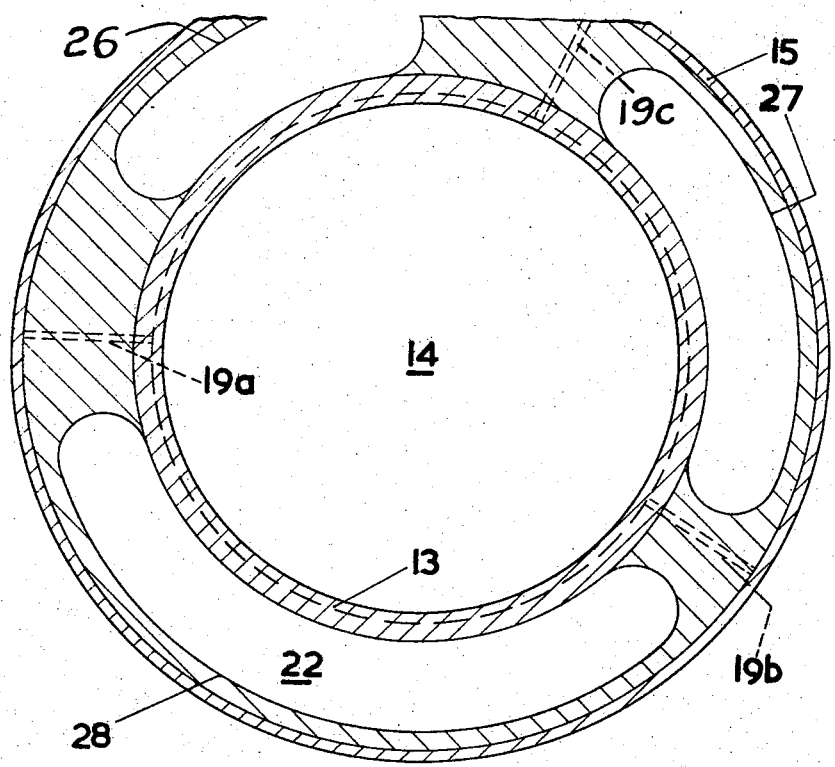
FIGURE 4 is a transverse sectional view of a helicopter rotor blade taken on the line IV—IV in FIGURE 2.
Figure 3:
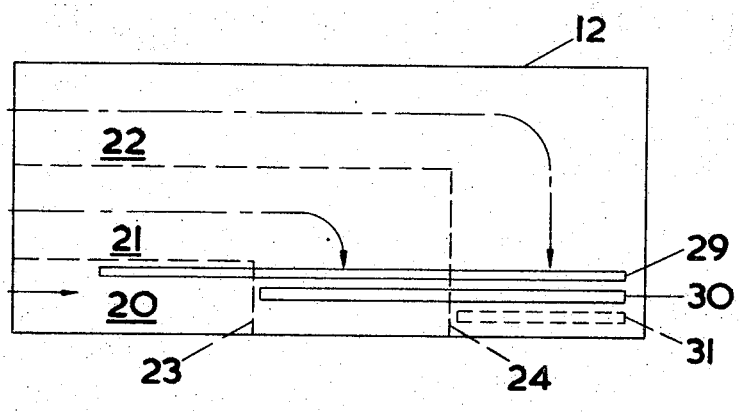
FIGURE 3 is a diagrammatic representation of a helicopter rotor blade in plan.

The blades are each divided spanwise into inboard, mid-span, and outboard sections as shown diagrammatically in FIGURE 3 in which the blade root is on the left and the blade tip at the right. In the inboard section, radial partitions 19a, b, c (FIGURE 4) extending between liner and shell divide the aforesaid annular space into three longitudinal passages 20, 21, 22. Passages 21 and 22 extend into the mid-span section of the blade at which point passage 20 is closed off by a blanking plate, indicated by 23. Similarly, passage 21 is closed off by blanking plate 24 leaving passage 22 alone to extend into the outboard section of the blade. Radial partitions 19a, b are continued into the mid-span section to terminate at blanking plate 24; partition 19c terminates at blanking plate 23. The flange 16 is provided with arcuate slots 26, 27, 28 (FIGURE 4) which communicate with passages 20, 21 and 22 respectively.

Figure 1:
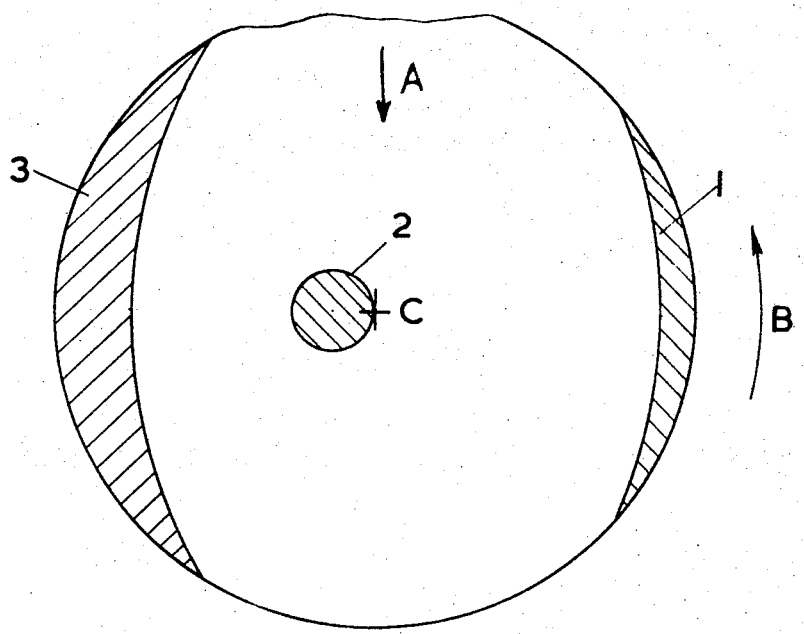
FIGURE 1 illustrates the various flow regions in a helicopter disc.
Figure 5:
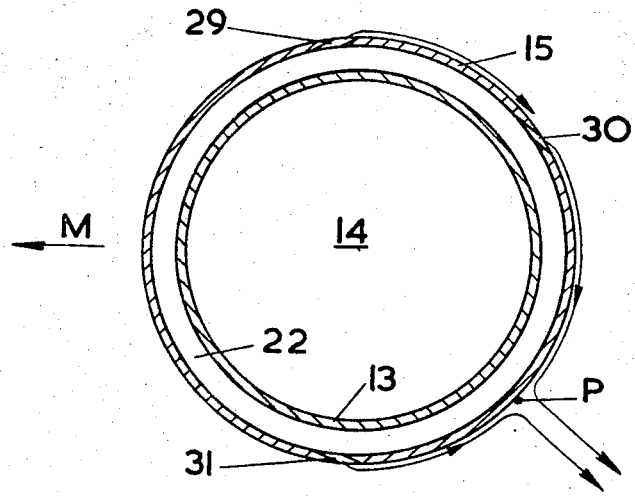
FIGURE 5 is a transverse sectional view of another part of the helicopter rotor blade.

The outboard section of the blade is provided with three slots or apertures 29, 30, 31 (see also FIGURE 5) extending through the shell 15. The first aperture 29 is at or near the top of the blade, aperture 30 is spaced rearwardly around the blade circumference at about 60°, and aperture 31 is located at a position diametrically opposite aperture 29, i.e., at or near the bottom of the blade. These apertures are all arranged to discharge thin layers of air from the passage 22 over the surface of rearward part of the blade. The aperture 29 is directed rearwardly with respect to the direction of rotation of the rotor (indicated by arrow M), the aperture 30 is directed rearwardly and downwardly and the aperture 31 is arranged to discharge rearwardly and upwardly.

The air streams from apertures 29 and 30 will combine to flow downwardly over the lower rear quadrant of the blade surface in a sense opposed to the upwardly and rearwardly directed stream from the aperture 31. What may be termed the rear stagnation point P is accordingly located where the opposed streams meet and lift on the blade will be thereby induced by circulation control. The opposed streams also tend to close up the wake behind the blade so that drag is reduced.

The aperture 29 extends in a spanwise direction across the mid-span section into the inboard section of the blade and aperture 30 likewise extends into the mid-span section of the blade. Thus, in the mid-span section, apertures 29 and 30 are in communication with passage 21 while the inboard part of aperture is connected with passage 20.

Although shown in the form of long narrow spanwise extending slots each aperture may be constituted by a series of short slots or a row of closely spaced holes.

Figure 8:
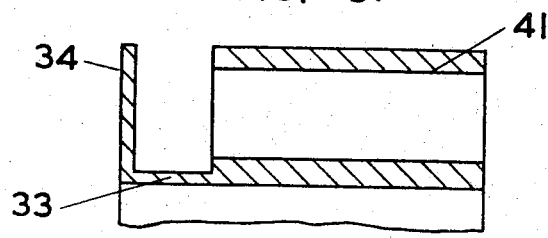
FIGURE 8 is a longitudinal section of part of the component of the previous two drawings taken on the line VIII—VIII therein.
Figure 6:
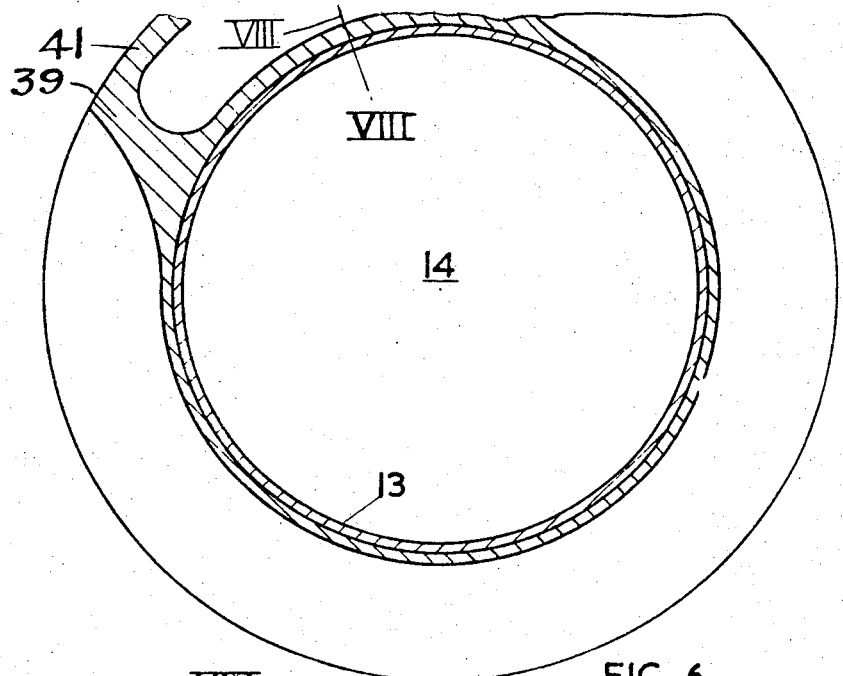
FIGURES 6 and 7 are transverse sectional views of a rotor blade component taken on the lines VI—VI and VII—VII respectively in FIGURE 2.
Figure 7:
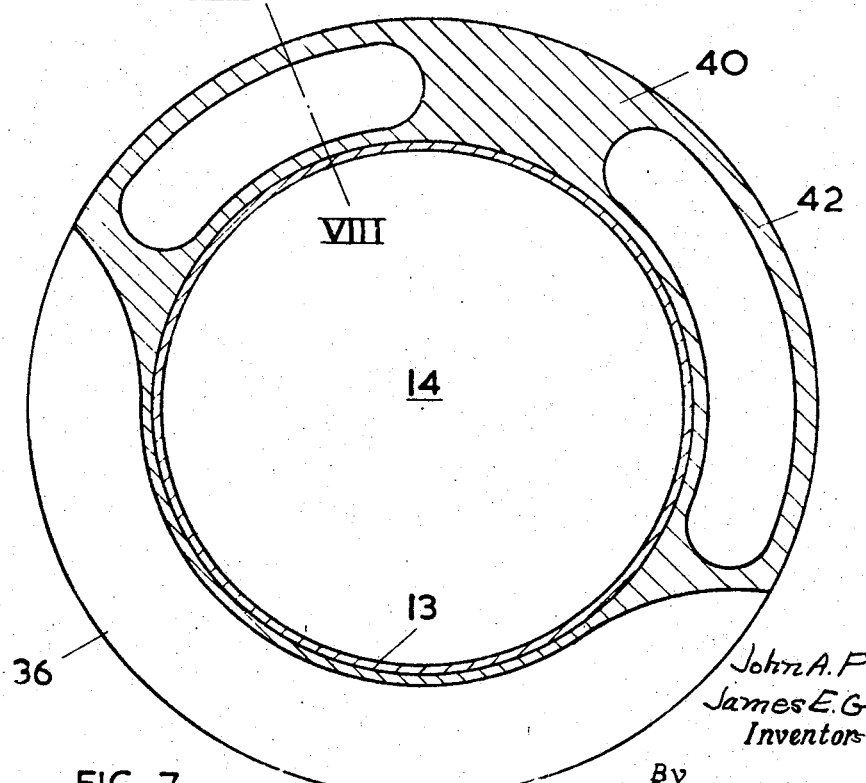

Referring again to FIGURE 2, the short section 32 of the blade liner 13 extending on the inner side of the flange 16 carries an air distributor 33. This is in the form of a collar with sections machined away to form lands 34, 35 and 36 which serve to guide air to ports whereby the said air is fed to the passages 20, 21, 22 in the blade proper. Between lands 34 and 35 the material is removed evenly to form an annular groove or dwell 37. A similar dwell 38 is formed between lands 35 and 36 but in this case only about two-thirds of the material is removed leaving an upstanding portion 39 (FIGURE 6). At the other side of land 36 the material is removed from around less than half of the circumference of the collar leaving a larger upstanding portion 40 (FIGURE 7). The upstanding portion 39 is pierced by an arcuate slot 41 which also extends through the corresponding section of the portion 40 (see FIGURE 8). Another arcuate slot 42 is pierced through that part of the upstanding portion 40 which has no counterpart in portion 39. When the air distributor is correctly assembled on extension 32, the slot 41 will be aligned with similar slot 26 in the flange 16 and slot 42 with slot 27 while the slot 28 in the flange will open on to a dwell 43 formed between the land 36 and the inner face of the flange. The passages 20, 21, 22 are thus each in communication with one of the dwells of the air distributor.

The air for the discharge apertures enters the blades through transfer ports 44 in the rotating head, one for each blade. The transfer ports are divided by baffles 45, 46 which are aligned with the lands 35, 36 of the air distributor so as to direct separate air streams into each of the distributor dwells.

Figure 9:
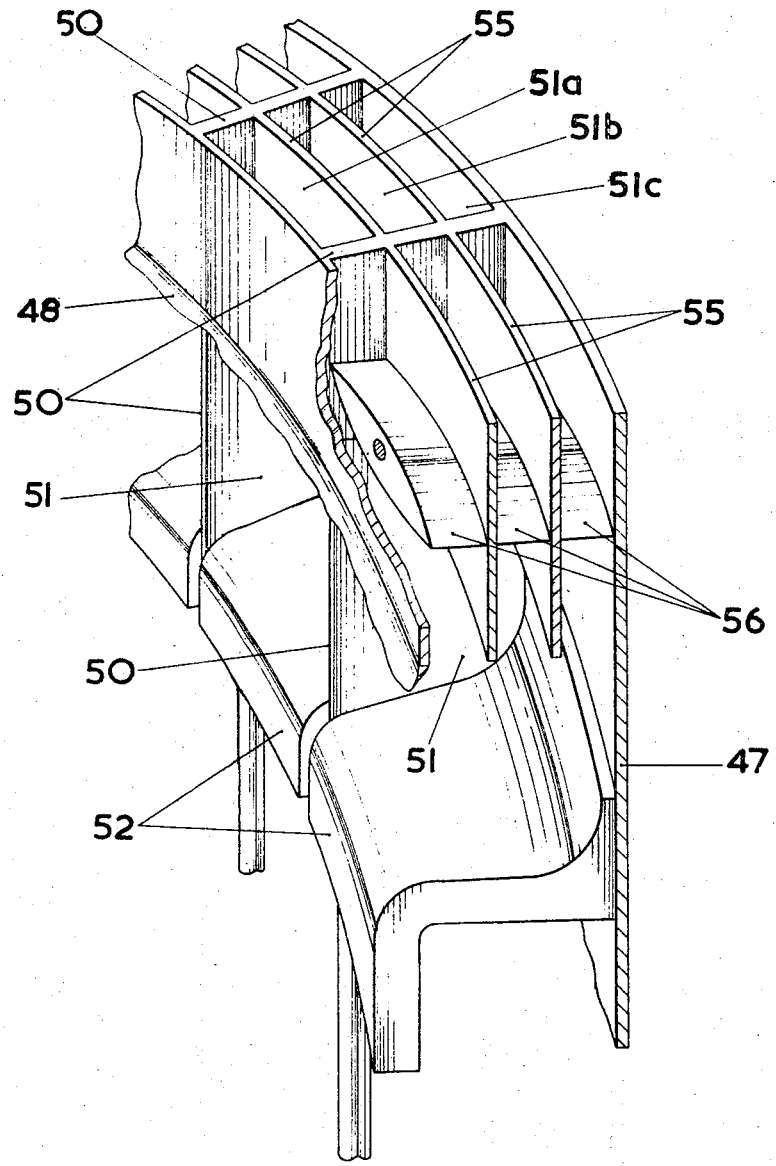
FIGURE 9 is a partially cut away view of a valve assembly forming part of the hub of FIGURE 2.

The air passes to the transfer ports by way of an annular valve assembly mounted co-axially about the pillar 10. The assembly includes a valve housing formed by two concentric walls 48, 49 (FIGURES 2 and 9) with a series of radial partitions 50 extending between them to form segmental ports 51. In each segmental port is a valve member 52 slideable up and down to close or open the port (as shown at the left and right hand sides, respectively of FIGURE 2). The valve faces and the passages through the ports are shaped so that movement of a valve from the open to the closed position gives a progressive throttling of the passage. The ports open out of an annular chamber 53 surrounding the pillar. A duct 54 connected to a suitable air supply source (such as the compressor of a gas turbine power plant) feeds air into the annular chamber.

The outlet from each of the ports 51 is divided into three channels 51a, b, c by circumferential splitter plates 55 extending between adjacent radial partitions 50. Throttle valves 56 are provided in each of the channels 51a, b, c, the three valves in the channels of each port being attached to co-axial concentric spindles which extend radially outwards through the outer wall of the valve assembly. The spindle of the radially inner valve passes through the centers of the central and outer valves to terminate in a knob 59. The spindle of the central valve is tubular and surrounds that of the valve first mentioned and in turn extends through the center of the outer valve to terminate in a disc-like knob 58 adjacent to the knob 59 and of larger diameter. Similarly the tubular spindle of the radially outer valve surrounds that of the central valve and terminates in disc-like knob 57 which is larger in diameter to adjacent knob 58. Thus each throttle valve 56 may be turned independently of the others by rotating its associated knob and so vary flow through the particular channel. The edges of the knobs 57, 58, 59 are provided with circumferentially-spaced notches and a spring-loaded locking device 60 has fingers arranged to engage the notches to prevent undesirable movement of the knobs. The locking device on the right side of the figure is shown in the engaged or locked position while that on the left side is disengaged leaving the knobs free to be rotated.

The transfer port of each blade has an entry of segmental shape which rides over the valve assembly, progressively receiving air simultaneously from the channels 51a, b, c according to the relative positions of the blades. The baffles 45 and 46 in the transfer ports are aligned with the splitter plates 55 so that the air streams emerging from the channels are directed to separate dwells in the air distributor as previously described. Thus, air flows through the hub assembly from the duct 54 into the annular chamber 53, through the valve ports 51 (according to the position of the slide valves 52) and into the blades via the transfer ports thence passing to the blade discharge apertures.

The air passing through the channels 51a, b, c is directed by the baffles 45, 46 and the dwells in the air distributor to separate spanwise sections of the rotor blade. By varying the flow through the channels by means of appropriate throttle valves the lift induced on the separate blade sections can be varied relative to the cyclic conditions existing in a particular region in the swept disc.

Each slide valve member 52 is connected to one end of a spring loaded push rod 61, the other end of which is provided with a tapped head 62. A swash plate 63 is carried on a part spherical bearing 64 mounted co-axially about the pillar 10. The bearing 64 forms part of a sleeve 65 slideably mounted on the pillar so as to be capable of movement axially along the pillar.

Movement of the sleeve 65 (together with the swash plate) up or down the pillar will move all slide valve members simultaneously in the same direction. By this means momentum of the air streams discharged from the apertures in opposite blades will be varied in the same sense to increase or decrease the total blade lift in similar fashion to conventional helicopter collective pitch control.

Tilting of the swash plate and movement of the sleeve may be obtained by operation of the pilot's controls in any suitable manner. For instance the swash plate may be controlled through differential adjustment of two hydraulic jacks set 90 degrees apart round the pillar and connected between the swash plate and some fixed structure. Similarly the sleeve member may be connected to the pillar supporting structure through the medium of one or more jacks or other linear actuators.

The aircraft is controlled when in flight in the helicopter role by control of the air supply to the boundary layer control apertures in the blades. Tilting the swash plate relative to the pillar gives a variation in valve opening circumferentially around the valve housing. The amount of air passing to the blade transfer ports and hence the relative momentum of the streams is thus varied in an appropriately phased relationship to the rotation of the rotor. Generally, it is desired to discharge more air from the apertures of the retreating blade than from those of the advancing blade. The overall effect is equivalent to the cyclic blade incidence changes (cyclic pitch control) in a conventional helicopter. The phase relationship between blade lift and rotor control can also be varied to effect roll and pitch control by varying the plane of inclination of the swash plate.

Splitting the air flow to the rotor blades into various channels at the hub, modulating these flows in azimuth and then feeding them to separate spanwise sections of the rotor blade will produce corresponding changes in the local rotor lift. This will cause a variation in the induced drag and profile drag of the local blade section which can be programmed to reduce vibration to an acceptable level. The positioning of the valves in the channels is also intended to be effected through remote control by conventional known means such as rocker levers attached to the spindles and operated by push rods or wire cables from some convenient point on the pillar or adjacent structure. Alternatively, synchronous motors or similar actuators might be used.

It is envisaged that changes in valve positioning could be effected by computer control whereby full account is taken of prevailing operating conditions and appropriate lift compensation made automatically.

The construction described may be used in conjunction with an arrangement wherein the slide valves can be adjusted independently of the movement of the swash plate by varying the effective lengths of their associated push rods.

The invention is equally applicable in a helicopter rotor in which mechanical drive is used instead of the tip jet propulsion system described.

In alternative constructions the arrangement of the apertures in the blades may be varied for instance in that the aperture in the rear lower quadrant of the outer section of the blade might either be eliminated or extended into the mid-span section. Alternatively there might be only one slot in each blade, extending over all spanwise divisions (of which there could be only two or more than three dependent on circumstances).

Furthermore, some departure from a strictly circular cross-section for the rotor blades (e.g., to an elliptical section) is permissible.

We claim:

1. A helicopter rotor comprising a non-rotatable member, a head member rotatably mounted on said non-rotatable member, at least one rotor blade attached to said head member to rotate therewith, at least one long shallow aperture in the surface of each blade extending along the blade span, means for feeding a fluid flow to the head member, means dividing each aperture spanwise into at least two separate sections, passages formed in each blade, each passage connected to conduct fluid flow from the head member to one of said spanwise aperture sections for discharge as a thin layer over the blade surface, and means for independently varying the fluid flowing to each of said passages.

2. A helicopter rotor according to claim 1, wherein said means for feeding fluid to the head member comprises a transfer port formed in said head member for cooperation with a plurality of non-rotating ports connected with a fluid supply, means dividing the outlets of each of said non-rotating ports into two fluid channels, and means dividing said transfer port so as to direct fluid from the separate channels of each of said outlets to separate sections of a blade aperture.

3. A helicopter rotor according to claim 2 in which the non-rotating ports are disposed co-axially relative to the head member and have circumferentially extending divisions disposed in their outlets.

4. A helicopter rotor assembly comprising a non-rotatable member, a head member rotatably mounted on said member, at least one rotor blade attached to said member to rotate therewith, at least one long shallow aperture in the surface of each blade extending along the blade span, a plurality of non-rotating axially-extending fluid ports disposed co-axially with the head member and including concentric walls having circumferentially spaced radial partitions extending between them, and at least one transfer port formed in the head member for leading fluid from said fluid ports into the head member in accordance with the rotation of the rotor, means dividing each aperture spanwise into at least two separate sections, said circumferentially extending splitters dividing the outlet of each fluid port into at least two channels, circumferentially extending baffles in each transfer port aligned with said splitters, passages formed in each blade to connect each section of an aperture separately to a transfer port, and independently operable throttle valves in each channel for varying the fluid flowing to each of said passages.

5. A helicopter rotor assembly as claimed in claim 4, wherein each blade is provided with a fluid distributor for directing fluid from a transfer port to separate spanwise sections of an aperture and a blade.

6. A helicopter rotor assembly as defined in claim 4 having valves slidably mounted in each of said axially extending fluid ports operable to vary fluid flow therethrough.

7. A helicopter rotor according to claim 2 in which each channel is provided with a valve and individual valves are capable of being adjusted differentially of each other.

8. A helicopter rotor according to claim 2 having at least two rotor blades and a transfer port associated with each blade, each transfer port being connected to conduct fluid to each aperture in the respective blade.

9. A helicopter rotor according to claim 2 in which the transfer port has an entry of segmental shape arranged to receive fluid flow from successive non-rotating ports in accordance with the rotation of the rotor.

10. A helicopter rotor according to claim 1 in which each blade is rigidly attached to the head member.

11. A helicopter rotor according to claim 1 in which each blade is substantially circular in cross-section.

12. A helicopter rotor according to claim 1 further comprising means for varying the momentum of the fluid streams discharged from each blade in phased relationship with the rotation of the rotor.

References Cited

UNITED STATES PATENTS 3,096,041  7/1963  Cheeseman et al. _ 170—135.4 X

MARTIN P. SCHWADRON, *Primary Examiner.*

EVERETTE A. POWELL, JR., *Examiner.*